United States Patent
Düsing et al.

(10) Patent No.: US 10,907,549 B2
(45) Date of Patent: Feb. 2, 2021

(54) METHOD FOR A PART LOAD CO REDUCTION OPERATION FOR A SEQUENTIAL GAS TURBINE

(71) Applicant: ALSTOM Technology Ltd, Baden (CH)

(72) Inventors: Michael Düsing, Rheinfelden (DE); Adnan Eroglu, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 447 days.

(21) Appl. No.: 14/576,712

(22) Filed: Dec. 19, 2014

(65) Prior Publication Data

US 2015/0101341 A1 Apr. 16, 2015

Related U.S. Application Data

(63) Continuation of application No. PCT/EP2013/063091, filed on Jun. 24, 2013.

(30) Foreign Application Priority Data

Jun. 29, 2012 (EP) .................................... 12174260

(51) Int. Cl.
*F02C 9/28* (2006.01)
*F02C 3/14* (2006.01)
(Continued)

(52) U.S. Cl.
CPC ................. *F02C 9/28* (2013.01); *F02C 3/14* (2013.01); *F02C 6/003* (2013.01); *F02C 7/228* (2013.01);
(Continued)

(58) Field of Classification Search
CPC .... F23R 2900/03341; F23R 3/46; F23R 3/50; F23C 6/04; F02C 9/28; F02C 9/20;
(Continued)

(56) References Cited

U.S. PATENT DOCUMENTS 5,321,949 A * 6/1994 Napoli ...................... F02C 9/34
60/739
5,577,378 A 11/1996 Althaus et al.
(Continued)

FOREIGN PATENT DOCUMENTS

DE 103 12 971 A1 12/2004
EP 0 321 809 A1 6/1989
(Continued)

OTHER PUBLICATIONS

Office Action (Notification of Reasons for Refusal) dated Apr. 3, 2017, by the Japanese Patent Office in corresponding Japanese Patent Application No. 2015-519010, and an English Translation of the Office Action. (12 pages).
(Continued)

*Primary Examiner* — Todd E Manahan
*Assistant Examiner* — Katheryn A. Malatek
(74) *Attorney, Agent, or Firm* — Buchanan Ingersoll & Rooney PC

(57) ABSTRACT

The invention concerns a method for a part load CO reduction operation and a low-CO emissions operation of a gas turbine with sequential combustion. The gas turbine essentially includes at least one compressor, a first combustor which is connected downstream to the compressor. The hot gases of the first combustor are admitted at least to an intermediate turbine or directly or indirectly to a second combustor. The hot gases of the second combustor are admitted to a further turbine or directly or indirectly to an energy recovery. At least one combustor runs under a caloric combustion path having a can-architecture, and wherein the air ratio ($\lambda$) of the combustion at least of the second combustor is kept below a maximum air ratio ($\lambda_{max}$).

19 Claims, 6 Drawing Sheets

(51) Int. Cl.
*F02C 6/00* (2006.01)
*F02C 9/34* (2006.01)
*F02C 7/228* (2006.01)
*F23C 6/04* (2006.01)

(52) U.S. Cl.
CPC ............... *F02C 9/34* (2013.01); *F23C 6/042* (2013.01); *F05D 2220/74* (2013.01); *F23R 2900/03341* (2013.01); *Y02E 20/14* (2013.01); *Y02E 20/16* (2013.01)

(58) Field of Classification Search
CPC ...... F02C 9/34; F02C 9/32; F02C 9/54; F23N 2027/10
See application file for complete search history.

(56) References Cited

U.S. PATENT DOCUMENTS

| | | | |
|---|---|---|---|
| 5,634,327 A | 6/1997 | Kamber et al. | |
| 8,434,312 B2* | 5/2013 | Eroglu | F02C 6/003 60/39.13 |
| 8,794,008 B2* | 8/2014 | Eroglu | F02C 6/003 60/39.13 |
| 2003/0221409 A1* | 12/2003 | McGowan | F02C 3/30 60/39.17 |
| 2012/0017601 A1* | 1/2012 | Eroglu | F02C 6/003 60/776 |

FOREIGN PATENT DOCUMENTS

| | | |
|---|---|---|
| EP | 0 620 362 A1 | 10/1994 |
| EP | 0 646 704 A1 | 4/1995 |
| EP | 0 646 705 A1 | 4/1995 |
| EP | 0 704 657 A2 | 4/1996 |
| EP | 0 718 470 A2 | 6/1996 |
| JP | H08-218898 A | 8/1996 |
| JP | H08-246896 A | 9/1996 |
| JP | 2002-235556 A | 8/2002 |
| JP | 2002235556 | 8/2002 |
| WO | WO 2010112318 A1 * | 10/2010 ............. F02C 6/003 |

OTHER PUBLICATIONS

European Office Action for European Patent Application Serial No. 13730889.6 dated Mar. 29, 2018.

* cited by examiner

METHOD FOR A PART LOAD CO REDUCTION OPERATION FOR A SEQUENTIAL GAS TURBINE

CROSS-REFERENCE TO RELATED APPLICATIONS

This application claims priority to PCT/EP2013/063091 filed Jun. 24, 2013, which claims priority to European application 12174260.5 filed Jun. 29, 2012, both of which are hereby incorporated in their entireties.

TECHNICAL FIELD

The invention refers to a method for operating a gas turbine with sequential combustion. The invention refers additionally to a gas turbine for implementing the method for operating a gas turbine with sequential combustion and low CO emissions.

BACKGROUND

CO emissions of gas turbine engines need reductions for the sake of saving the environment. Such emissions are known to appear, when there is not sufficient time in the combustion chamber to ensure the CO to $CO_2$ oxidation, and/or this oxidation is locally quenched due to contact with cold regions in the combustor. Since firing temperatures are smaller under part load conditions CO, and the CO to $CO_2$ oxidation gets slower, thus CO emissions usually tend to increase under these conditions.

A reduction of CO emissions in turn might be invested in lowering the gas turbine load at the parking point of a gas turbine. This reduces the environmental impact due to reduced $CO_2$ emissions and overall cost of electricity due to less fuel consumption during engine parking. Finally the CO emission reduction might be invested in a reduction of first costs due to savings on a CO catalyst. In this case a CO catalyst might be avoided (or at least reduced). At the same time losses, which appear due a catalyst will be removed (or at least reduced), and thereby the overall efficiency of the power plant increased.

According to the US 2012/0017601 A1 the basic of this state of art is a method for operating the gas turbine, which keeps the air ratio $\lambda$ of the operating burner of the second combustor below a maximum air ratio $\lambda_{max}$ during part load operation. This method is characterized essentially by three new elements and also by supplementing measures which can be implemented individually or in combination.

The maximum air ratio $\lambda_{max}$ in this case depends upon the CO emission limits which are to be observed, upon the design of the burner and of the combustor, and also upon the operating conditions, that is to say especially the burner inlet temperature.

The first element is a change in the principle of operation of the row of variable compressor inlet guide vanes, which allows the second combustor to be put into operation only at higher part load. Starting from no-load operation, the row of variable compressor inlet guide vanes is already opened while only the first combustor is in operation. This allows loading up to a higher relative load before the second combustor has to be put in operation. If the row of variable compressor inlet guide vanes is opened and the hot gas temperature or turbine inlet temperature of the high-pressure turbine has reached a limit, the second combustor is supplied with fuel.

In addition, the row of variable compressor inlet guide vanes is quickly closed. Closing of the row of variable compressor inlet guide vanes at constant turbine inlet temperature TIT of the high-pressure turbine, without countermeasures, would lead to a significant reduction of the relative power.

In order to avoid this power reduction, the fuel mass flow, which is introduced into the second combustor, can be increased. The minimum load at which the second combustor is put into operation and the minimum fuel flow into the second combustor are therefore significantly increased.

As a result, the minimum hot gas temperature of the second combustor is also increased, which reduces the air ratio $\lambda$ and therefore reduces the CO emissions.

The second element for reducing the air ratio $\lambda$ is a change in the principle of operation by increasing the turbine exhaust temperature of the high-pressure turbine TAT1 and/or the turbine exhaust temperature of the low-pressure turbine TAT2 during part load operation. This increase allows opening of the row of variable compressor inlet guide vanes to be shifted to a higher load point.

Conventionally, the maximum turbine exhaust temperature of the second turbine is determined for the full load case and the gas turbine and possibly the downstream waste heat boiler are designed in accordance with this temperature. This leads to the maximum hot gas temperature of the second turbine not being limited by the TIT2 (turbine inlet temperature of the second turbine) during part load operation with the row of variable compressor inlet guide vanes closed, but by the TAT2 (turbine exhaust temperature of the second turbine). Since at part load with at least one row of variable compressor inlet guide vanes closed the mass flow and therefore the pressure ratio across the turbine is reduced, the ratio of turbine inlet temperature to turbine exhaust temperature is also reduced.

Correspondingly, with constant TAT2 the TIT2 is also reduced and in most cases lies considerably below the full load value. A proposed slight increase of the TAT2 beyond the full load limit, typically within the order of magnitude of 10° C. to 30° C., admittedly leads to an increase of the TIT2, but this remains below the full load value and can practically be achieved without service life losses, or without significant service life losses. Adaptations in the design or in the choice of material do not become necessary or can be limited typically to the exhaust gas side. For increasing the TIT2, the hot gas temperature is increased, which is realized by an increase of the fuel mass flow and a reduction of the air ratio A, which is associated therewith. The CO emissions are correspondingly reduced.

A further possibility for reducing the air ratio $\lambda$ of the burner in operation is the deactivating of individual burners and redistribution of the fuel at constant TIT2.

In order to keep the TIT2 constant on average, the burner in operation has to be operated hotter in proportion to the number of deactivated burners. For this, the fuel feed is increased and therefore the local air ratio $\lambda$ is reduced.

For an operation which is optimized for CO emissions, in a gas turbine with parting plane, a burner (for example for the second combustor) which is adjacent to the parting plane is typically deactivated first of all. In this case, the plane in which a casing is typically split into upper and lower halves is referred to as the parting plane. The respective casing halves are connected in the parting plane by a flange, for example.

Its adjacent burners are subsequently then deactivated or a burner, which is adjacent to the parting plane on the opposite side of the combustor is deactivated and in alternating sequence the adjacent burners, which alternate on the two sides of the combustor, starting from the parting plane, are deactivated.

A burner which is adjacent to the parting plane is preferably deactivated first of all since the parting plane of a gas turbine is typically not absolutely leak proof and in most cases a leakage flow leads to a slight cooling and dilution of the flammable gases and therefore to locally increased CO emissions. As a result of deactivating the burners which are adjacent to the parting plane, these local CO emissions are avoided.

A further possibility for reducing the air ratio $\lambda$ is a controlled "staging". Homogenous combustion processes can lead to pulsations in annular combustors. These are typically avoided at high load by means of a so-called "staging". Restricting the fuel feed to at least one burner is understood by staging. For this, a restrictor or another throttling element is fixedly installed in the fuel line of the at least one burner which is to be restricted. The air ratio $\lambda$ of the at least one restricted burner becomes greater in proportion to the reduced fuel quantity for all the operating states. At high load, this leads to a desired inhomogeneity in the annular combustor. At low load, this inhomogeneity, however, leads to an over-proportional increase of CO production of the at least one restricted burner.

The combustion instabilities, which are to be avoided by means of staging, as a rule no longer occur at low load, or are negligibly small. In one exemplary embodiment, it is proposed, therefore, to carry out the restricting not by means of a fixed restrictor but by means of at least one control valve. This at least one control valve is opened at low load so that all the activated burners can be operated virtually homogenously with a low air ratio $\lambda$. At high load, the at least one control valve is throttled in order to realize the staging.

SUMMARY

The present invention is based on the object of proposing a method for operating a gas turbine with sequential combustion and also a gas turbine with sequential combustion, which enables operation with reduced CO emissions.

The invention described below aims CO reduction for gas turbines, which are using at least one combustor including a can-architecture with sequential combustion under part load conditions. A generic sketch of such a gas turbine is shown for example in FIG. 1. Therein a compressor is followed by a combustor section, which consists of a number of cans. Within these cans a first combustor is followed by a second combustor. Between these two combustors dilution air might be injected in order to control the inlet temperature of the second combustor and therefore the self-ignition time of the fuel injected therein. Finally the hot combustion gases are fed into a turbine.

A can-architecture is also given, when an annular first and/or second combustion chamber having or comprising to each burner in flow direction an independent can or a separating flow combustion area which is wall-isolated from each other of the adjacent combustion areas.

In order to a matching of components for the reduction of the locally occurring air ratio $\lambda$ is proposed. For this, the geometries and/or flow coefficients of the various components are measured and components with high flow rates and components with low flow rates are combined inside the combustor cans.

The gas turbine comprises essentially at least one compressor a first combustor which is connected downstream to the compressor. The hot gases of the first combustor are admitted at least to an intermediate turbine or directly or indirectly to a second combustor. The hot gases of the second combustor are admitted to a further turbine or directly or indirectly to an energy recovery, for example to a steam generator.

At least one combustor runs under a caloric combustion path having a can-architecture, and wherein the air ratio ($\lambda$) of the combustion at least of the second combustor is kept below a maximum air ratio ($\lambda_{max}$). Accordingly, the first and/or second combustor is designed as a can-architecture, while the remaining combustor or both combustors can be designed as an annular combustion chamber. A caloric combustion path is a flow path in which heat is released by combustion. A caloric combustion path can be enclosed by a duct guiding compressed air from the compressor exit to the turbine inlet. In a can architecture a plurality of can combustors is arranged circumferentially spaced around the axis gas of the turbine. The flow path of each can is part of a caloric combustion flow path.

When ramping up a gas turbine using a sequential combustion system the first combustor is ignited first, while the second combustor is not ignited yet. The first combustor being reaches its design point at relatively low relative load. Then the second combustor is ignited starting with a minimum amount of fuel, which is afterwards increased continuously until base-load is reached. At the point, where the second combustor is running at a relatively small amount of fuel, the temperatures in the combustor are relatively small. Thus CO oxidation to $CO_2$ is limited, leading to increased CO emissions.

In contrast to the conventional concept, the fuel foreseen for the second burner will be distributed to a few burners only, while others are kept off. During load up the amount of burners turned on is increasing in order not to violate the allowed turbine inlet parameters. Doing so the reheat burner stage of individual cans is shut off, leading to no CO production for these cans. On top of this those burners of the second stage, who receive fuel are running at significantly higher temperature and therefore will emit less CO than for the nominal average turbine inlet temperature at the load point of the gas turbine. In a simple setup the sequence of reheat burners receiving fuel is predefined.

Furthermore, in the conventional concept all can combustors are intended to run at the same firing temperatures and therefore (assuming similar air distribution, and leakage status) at the same CO emissions. This is in general not valid due to misdistribution of flows between the cans, manufacturing tolerances, etc. In order to make CO reduction the most effective preferable those can combustors shall be turned off, which show the lowest temperature at the second combustor inlet, since those combustors are expected to show larger CO emissions, compared to the other burners. This more advanced setup is expected to result in even lower CO emissions, while the gas turbine operation concept and fuel distribution system gets more complicated.

For the setup described above the remaining CO from the first stage will not be oxidized in the combustor of the second stage, since the temperature after adding dilution air is to low for effective CO oxidation. Nevertheless these CO emissions are usually small, since the premix burners are basically operated at their design point. In order to minimise even these emissions, the additional dilution air can be turned off (or throttled) using a valve for those cans, where the second combustor is off anyway (see FIG. 2 below). This is possible since for these cans the time, which would be needed for autoignition of the fuel, is irrelevant. In this setup the volume of the mixing section and the second stage can be used for further oxidation of the CO generated by the first combustor. In addition this option helps to reduce circumferential temperature gradients at the turbine inlet. These benefits result from an increase of the lifetime of turbine parts. Of cause the possibility to vary the dilution air complicates the gas turbine architecture.

Based on these findings the concept can be expected to work for an engine, which runs under sequential combustion (with or without a high pressure turbine) in a can-architecture, but not only.

Referring to a sequential combustion the combination of combustors can be dis-posed as follows:

At least one combustor is configured as a can-architecture, with at least one operating turbine.

Both, the first and second combustors are configured as sequential can-can architecture, with at least one operating turbine.

The first combustor is configured as an annular combustion chamber and the second combustor is built-on as a can configuration, with at least one operating turbine.

The first combustor is configured as a can-architecture and the second combustor is configured as an annular combustion chamber, with at least one operating turbine.

Both, the first and second combustor are configured as annular combustion chambers, with at least one operating turbine.

Both, the first and second combustor are configured as annular combustion chambers, with an intermediate operating turbine.

Accordingly, in terms of CO emissions for a can-architecture the interaction between individual cans is minimal or inexistent. On top of this leakages at the split plane, which are known to affect CO for annular concepts, will not impact the CO for a can engine, i.e. a gas turbine with can architecture and in particular for a gas turbine in which both combustors are in can architecture, since for this architecture split line leakages into the combustor exist only at the latest end of the transition piece. Therefore for a can variant the described concept will be even more effective than for annular engine architecture.

In addition to the method, a gas turbine for implementing the method is a subject of the invention. Depending upon the chosen method or combination of methods, the design of the gas turbine has to be adapted and/or the fuel distribution system and/or the cooling air system have to be adapted in order to ensure the feasibility of the method.

One embodiment is characterized, for example, by a determination of different components for reducing the locally occurring air ratio A. All the components of a gas turbine lie within the range of permissible tolerances. These tolerances lead to slightly different geometries and characteristics for each component.

This, especially, also leads to different pressure losses and flow rates during operation. The tolerances are selected so that they have practically no influence upon the operating behavior during normal operation, especially at high part load and full load. At part load with high air ratio A, the combustor can, however, is operated under conditions in which even small disturbances can have a significant influence upon the CO emissions. If, for example, a fuel lance with a low flow co-efficient is installed in a can's burner with large cross sectional area, this combination can lead to an increase of the local air ratio A, which leads to a locally increased production of CO.

In order to avoid this, a matching of components for the reduction of the locally occurring air ratio $\lambda$ is proposed. For this, the geometries and/or flow coefficients of the various components are measured and components with high flow rates and components with low flow rates are combined inside the combustor cans.

The advantages associated with this invention are as follows:

CO emissions are reduced especially at lower part-load conditions. Therefore, the gas turbine can be parked at lower values during periods, where low power output being aspired by the power plant operator.

Thereby the power plant operator can save fuel and therefore reduce the overall cost of electricity.

Environmental benefit due to reduced CO emissions, lower parking point (thus less fuel consumption and $CO_2$ production) or a combination of both advantages.

Possibility of eliminating an expensive CO catalyst. Therefore first costs are reduced.

When using a setup including dilution air switching/variation between the cans further advantages arise:

Further CO reduction, with all advantages described above, due to increased volume for CO oxidation with origin in the first combustor.

Reduction of circumferential temperature gradients between the different can combustors. Therefore the turbine inlet profile is improved and lifetime of turbine parts is improved.

BRIEF DESCRIPTION OF THE DRAWINGS

The invention is shown schematically in FIGS. 1 to 4 based on exemplary embodiments.

Schematically, in the drawings.

DETAILED DESCRIPTION

Figure 1:
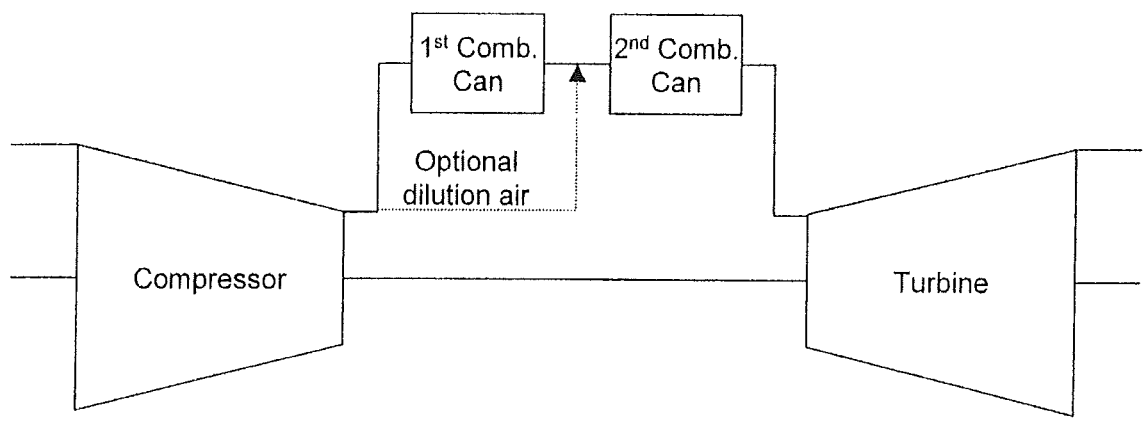
FIG. 1 shows a generic gas turbine using sequential combustion in a can-architecture.
Figure 2:
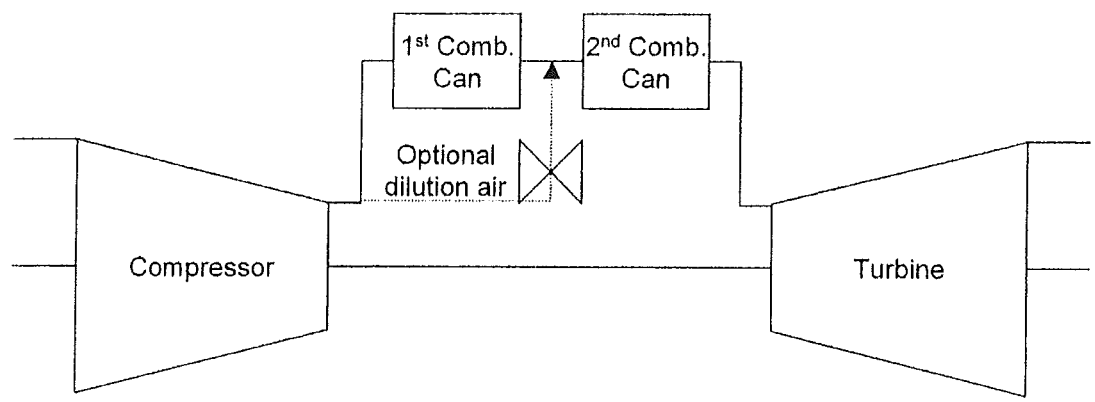
FIG. 2 shows a gas turbine using sequential combustion in a can-architecture, thereby a valve for modulation of the dilution air is added.
Figure 3:
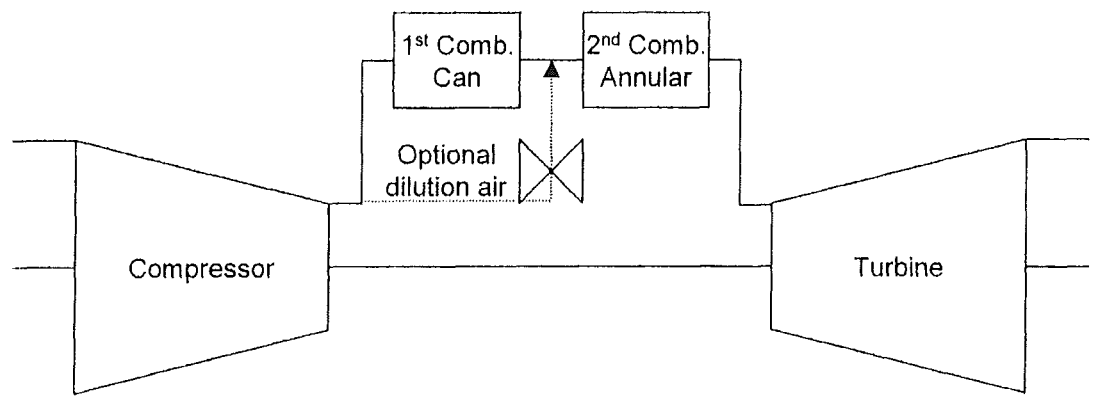
FIG. 3 shows a gas turbine using sequential combustion in a can/annular architecture.

FIGS. 1 to 3 shows gas turbine with sequential combustion for implementing the method according to the invention. It comprises a compressor, a first combustor can, a second combustor can and a turbine. Typically, it includes a here not shown generator, which at the cold end of the gas turbine, that is to say at the compressor, is coupled to a shaft of the gas turbine.

FIG. 1 shows a generic gas turbine using sequential combustion in a can-architecture, thereby a valve for modulation of the dilution air is added;

FIG. 2 shows a generic gas turbine using sequential combustion in a can-architecture, thereby a valve for modulation of the dilution air is added;

FIG. 3 shows a generic gas turbine using sequential combustion in a can/annular architecture, thereby a valve for modulation of the dilution air is added;

On top of the engine architecture shown in FIG. 1 and FIG. 2 the concept is expected to work on the engine architectures shown in FIG. 3. Thereby basically the transition between the can and the annular architecture has been shifted between the two burners.

Figure 4:
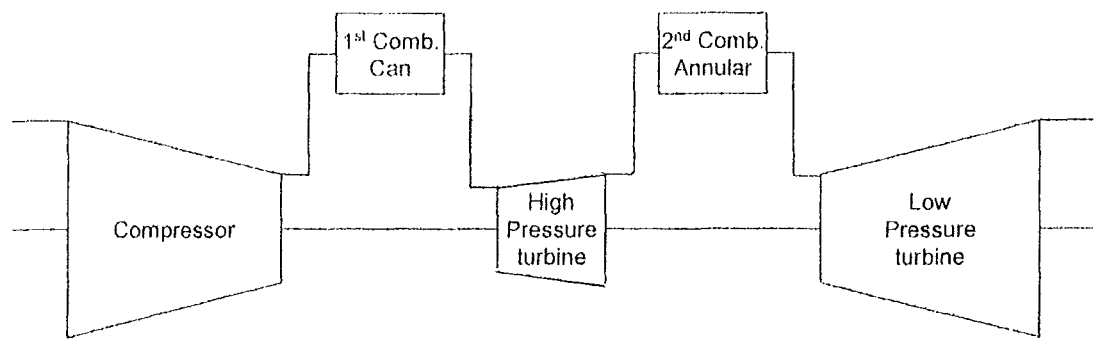
FIG. 4 shows a gas turbine using sequential combustion in a can/annular architecture using a high-pressure turbine between the two combustors.

FIG. 4 shows a generic gas turbine using sequential combustion firstly in a can-architecture a subsequently in an annular architecture using a high-pressure turbine between the two combustors. The system is expected to work for a configuration, wherein a high-pressure turbine has been added, which is replacing the dilution air. In this setup it is preferable to use the annular engine architecture for the second combustor, while the first combustor can run in cans.

Figure 5:
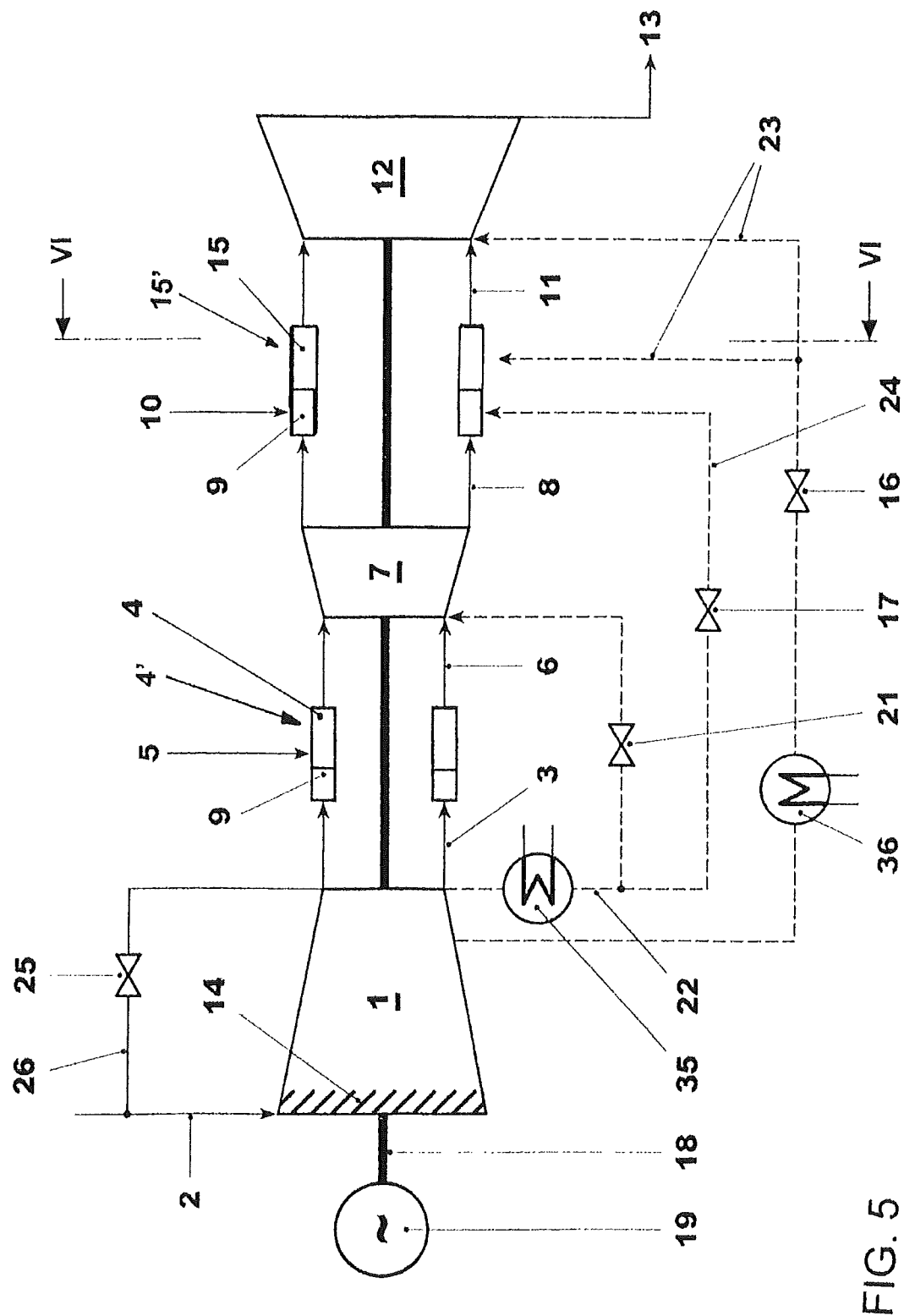
FIG. 5 shows detailed a gas turbine with sequential combustion for implementing the method according to the invention.

FIG. 5 shows a detailed gas turbine with sequential combustion for implementing the method according to the invention. It comprises a compressor 1, a first combustor 4', a first turbine 7, a second combustor 15' and a second turbine 12. Typically, it includes a generator 19 which at the cold end of the gas turbine, that is to say at the compressor 1, is coupled to a shaft 18 of the gas turbine. The first combustor 4' and the second combustor 15' run in a can-architecture, while the first turbine 7 is optionally.

The can architecture in the various FIGS. 1-6 comprises a plurality of cans arranged in an annular array about the circumference of the turbine shaft (FIG. 6), which enables an individual combustion operation of each can 4, 15, and which will be no harmful interactions among individual cans during the combustion process.

A fuel, gas or oil is introduced via a fuel feed 5 into the can 4 of the first combustor 4', mixed with air which is compressed in the compressor 1, and combusted. The hot gases 6 are partially expanded in the subsequent first turbine 7, performing work.

As soon as the second combustor is in operation, additional fuel, via a fuel feed 10, is added to the partially expanded gases 8 in burners 9 of the cans 15 of the second combustor 15' and combusted in the cans 15 of the second combustor 15'. The hot gases 11 are expanded in the subsequent second turbine 12, performing work. The exhaust gases 13 can be beneficially fed to a waste heat boiler of a combined cycle power plant or to another waste heat application.

For controlling the intake mass flow, the compressor 1 has at least one row of variable compressor inlet guide vanes 14.

In order to be able to increase the temperature of the intake air 2, provision is made for an anti-icing line 26 through which some of the compressed air 3 can be added to the intake air 2. For control, provision is made for an anti-icing control valve 25. This is usually engaged on cold days with high relative air moisture in the ambient air in order to forestall a risk of icing of the compressor 1.

Some of the compressed air 3 is tapped off as high-pressure cooling air 22, re-cooled via a high-pressure cooling air cooler 35 and fed as cooling air 22 to the first combustor 4 (cooling air line is not shown) and to the first turbine.

The mass flow of the high-pressure cooling air 22, which is fed to the high-pressure turbine 7, can be controlled by means of a high-pressure cooling air control valve 21 in the example.

Some of the high-pressure cooling air 22 is fed as so-called carrier air 24 to the burner lances of the burners 9 of the cans 15 of the second combustor 15'. The mass flow of carrier air 24 can be controlled by means of a carrier-air control valve 17.

Some of the air is tapped off, partially compressed, from the compressor 1, re-cooled via a low-pressure cooling air cooler 36 and fed as cooling air 23 to the cans 15 of the second combustor 15' and to the second turbine. The mass flow of cooling air 23 can be controlled by means of a cooling-air control valve 16 in the example.

One or more of the combustors can be constructed as annular combustors, for example, with a large number of individual burners 9 (see FIG. 5), as is generic shown in FIG. 4 by way of example of the second combustor. Each of these burners 9 is supplied with fuel via a fuel distribution system and a fuel feed 10, figuratively in accordance with FIG. 6.

Figure 6:
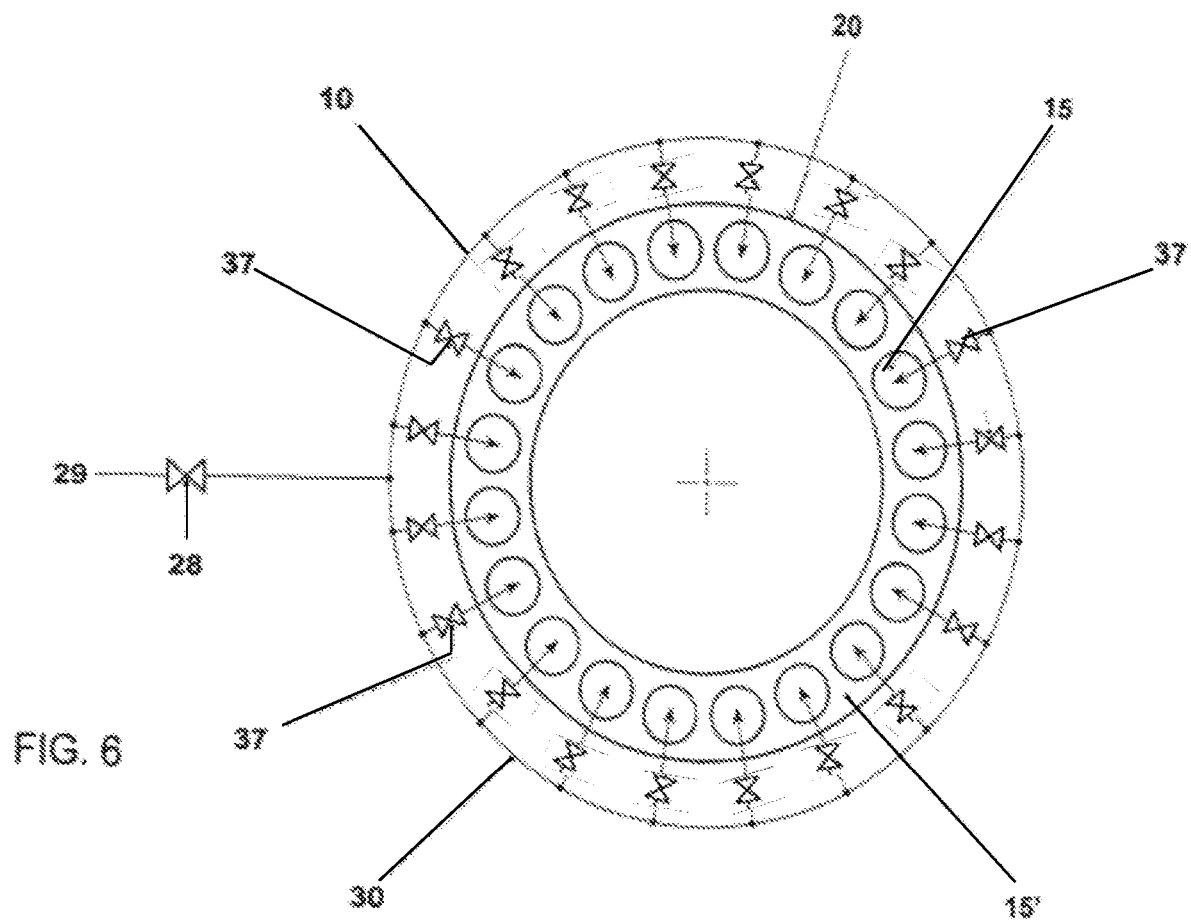
FIG. 6 shows a section through for example the second combustor with burners.

FIG. 6 shows a section through for example the second combustor 15' with an annular disposition of a can architecture 15 of a gas turbine with sequential combustion, and also the fuel distribution system with a fuel ring main 30 to the burners 9 (see FIG. 5) of every can 15 and for example eight individual on/off valves 37 for deactivating eight burners 9 and to this effect for eight cans 15. The same can architecture can be arranged for the first combustor 4'. By closing individual on/off valves 37, the fuel feed to individual burners 9 of every can 15, and correspondingly 4, is stopped and this is distributed to the remaining burners and to this effect to the remaining cans, wherein the overall fuel mass flow is controlled via a control valve 28. As a result, the air ratio λ of the burners 9 in operation is reduced. A single burner 9 can be provided with individual control valves (not shown) for controlling the fuel flow in the fuel feeds 10 to the respective burner 9.

Item 20 shows the external body housing of the gas turbine with including a stator arrangement (not shown) in connection with the compressor and turbines If premix burners for the can's combustion are provided, these should preferably be formed by the combustion process and objects according to the documents EP 0 321 809 A1 and/or EP 0 704 657 A1, wherein these documents forming integral parts of the present description.

In particular, said premix burners can be operated with liquid and/or gaseous fuels of all kinds. Thus, it is readily possible to provide different fuels within the individual cans. This means also that a premix burner can also be operated simultaneously with different fuels.

The second or subsequent combustor can is preferably carried out by EP 0 620 362 A1 or DE 103 12 971 A1, wherein these documents forming integral parts of the present description.

Additionally, the following mentioned documents forming also integral parts of the present description:

EP 0 321 809 A and B relating to a burner consisting of hollow part-cone bodies making up a complete body, having tangential air inlet slots and feed channels for gaseous and liquid fuels, wherein in that the centre axes of the hollow part-cone bodies have a cone angle increasing in the direction of flow and run in the longitudinal direction at a mutual offset. A fuel nozzle, which fuel injection is located in the middle of the connecting line of the mutually offset centre axes of the part-cone bodies, is placed at the burner head in the conical interior formed by the part-cone bodies.

EP 0 704 657 A and B, relating to a burner arrangement for a heat generator, substantially consisting of a swirl generator, substantially according to EP 0 321 809 A and B, for a combustion air flow and means for injection of fuel, as well of a mixing path provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

Furthermore, it is proposed fuel injector for use within a gas turbine reheat combustor, utilising auto-ignition of fuel, in order to improve the fuel air mixing for a given residence time. The specific embodiments of this injector are envisaged:

The oscillating gaseous fuel is injected normal to the flow of oxidant in sense of a cross-flow configuration.

The oscillating gaseous fuel is injected parallel to the flow of oxidant in sense of an in-line configuration.

The oscillating gaseous fuel is injected at an oblique angle, between 0° and 90° to the flow of oxidant.

EP 0 646 705 A and B, relating to a method of establishing part load operation in a gas turbine group with a sequential combustion.

EP 0 646 704 A and B, relating to a method for controlling a gas turbine plant equipped with two combustor chambers.

EP 0 718 470 A and B, relating to method of operating a gas turbine group equipped with two combustor chambers, when providing a partial-load operation.

Other relevant published documents, which include one or more improvements of the above identified documents forming also integral parts of the present description.

The disclosure is summarized in the flowing embodiments

A method for a part load CO reduction operation and a low-CO emissions operation of a gas turbine with sequential combustion, wherein the gas turbine essentially comprises at least one compressor, a first combustor which is connected downstream to the compressor, and the hot gases of the first combustor are admitted at least to an intermediate turbine or directly or indirectly to a second combustor, wherein the hot gases of the second combustor are admitted to a further turbine or directly or indirectly to an energy recovery, wherein at least one combustor runs under a caloric combustion path having a can-architecture and wherein the air ratio $\lambda$ of the combustion at least of the second combustor is kept below a maximum air ratio $\lambda_{max}$.

In a further embodiment of the method the first and second combustor run under a caloric combustion path having a can-architecture.

A method for a part load CO reduction operation and a low-CO emissions operation of a gas turbine with sequential combustion, wherein the gas turbine essentially comprises at least one compressor, a first combustor which is connected downstream to the compressor, and the hot gases of the first combustor are admitted at least to an intermediate turbine or directly or indirectly to a second combustor, wherein the hot gases of the second combustor are admitted to a further turbine or directly or indirectly to an energy recovery, wherein the first combustor runs under a caloric combustion path having an annular architecture, and the second combustor runs under a caloric combustion path having a can-architecture, and wherein the air ratio $\lambda$ of the combustion at least of the second combustor is kept below a maximum air ratio $\lambda_{max}$.

A method for a part load CO reduction operation and a low-CO emissions operation of a gas turbine with sequential combustion, wherein the gas turbine essentially comprises at least one compressor, a first combustor which is connected downstream to the compressor, and the hot gases of the first combustor are admitted at least to an intermediate turbine or directly or indirectly to a second combustor, wherein the hot gases of the second combustor are admitted to a further turbine or directly or indirectly to an energy recovery, wherein the first combustor runs under a caloric combustion path having a can-architecture, and the second combustor runs under a caloric combustion path having an annular architecture, and wherein the air ratio $\lambda$ of the combustion at least of the second combustor is kept below a maximum air ratio $\lambda_{max}$.

A method for a part load CO reduction operation and a low-CO emissions operation of a gas turbine with sequential combustion, wherein the gas turbine essentially comprises at least one compressor, a first combustor which is connected downstream to the compressor, and the hot gases of the first combustor are admitted at least to an intermediate turbine or directly or indirectly to a second combustor, wherein the hot gases of the second combustor are admitted to a further turbine or directly or indirectly to an energy recovery, wherein at least one combustor runs under a caloric combustion path having an annular architecture, and wherein the air ratio $\lambda$ of the combustion at least of the second combustor is kept below a maximum air ratio $\lambda_{max}$.

In a further embodiment of the method the first and second combustor run under a caloric combustion path having an annular architecture.

In another embodiment of the method the air ratio $\lambda$ of the combustion of the second combustor is kept below a maximum air ratio $\lambda_{max}$.

In another embodiment of the method a load increase, before engaging the second combustor, the turbine inlet temperature of a first turbine TIT1 is first of all increased to a part load limit and the row of variable compressor inlet guide vanes is opened, and for engaging or when engaging the second combustor, the row of variable compressor inlet guide vanes is closed and fuel is introduced into the second combustor.

In yet another embodiment of the method characterized in that when unloading, before disengaging the second combustor, the row of variable compressor inlet guide vanes is closed and this is opened again upon the disengaging of the second combustor.

In another embodiment of the method, when unloading the gas turbine, in order to create a hysteresis, the second combustor is only shut down at a load which lies below the load which is achieved during operation with the first combustor at the part load limit of the turbine inlet temperature of a first turbine TIT1 and with the row of variable compressor inlet guide vanes opened.

In another embodiment of the method the fuel feed to at least one burner of the cans of the second combustor is shut off at part load so that with unaltered turbine inlet temperature of a second turbine, the air ratio of the burners in oxygen operation is reduced.

In another embodiment of the method the number of deactivated cans of the correspondent combustor is inversely proportional to the load or basically inversely proportional to the load.

In another embodiment of the method characterized in that the part load limit of the turbine exhaust temperature TAT1 of the first turbine and/or of the second turbine TAT2 is increased for a part load range in order to shift the opening of the row of variable compressor inlet guide vanes to a higher load.

In another embodiment of the method a partial flow of compressed or partially compressed compressor air is added at least to upstream of the second combustor.

In another embodiment of the method at least one cooling air temperature and/or at least one cooling air mass flow is controlled as a function of the load.

In another embodiment of the method the fuel temperature of the first and/or second combustor is controlled as a function of the load.

Further embodiments relate to a gas turbine for implementing the above described methods, comprising a compressor, a first combustor which is connected downstream to the compressor and the hot gases of which are admitted to a first turbine or to a second combustor, and the second combustor which is connected downstream to the first turbine or directly to the first combustor and the hot gases of which are admitted to a first or second turbine respectively, wherein at least the first or second combustor runs in a can architecture.

In a further embodiment of the gas turbine an individual on/off valve is arranged in at least one fuel line to at least one burner of a single can of the first and/or second combustor.

In a further embodiment of the gas turbine an individual control valve is arranged in at least one fuel line to at least one burner of a single can of the first and/or second combustor, and/or a fuel distribution system includes a first fuel control valve and also a first fuel ring main for distribution of the fuel to the burners of a first can sub-group and includes at least one second fuel control valve and also at least one second fuel ring main for distribution of the fuel to the burners of at least one can second sub-group.

In a further embodiment of the gas turbine the high-pressure compressor is designed for a pressure ratio which is higher than is required for reliable operation at full load.

In a further embodiment of the gas turbine the turbine exhaust and the exhaust gas lines are designed for a turbine exhaust temperature of the first or second turbine TAT1/TAT2 which is higher than the maximum full-load exhaust gas temperature.

The invention claimed is:

1. A method for CO reduction operation and a low-CO emissions operation of a gas turbine with sequential combustion, wherein the gas turbine includes at least one compressor, a first combustor which is connected downstream to the at least one compressor that feeds hot gas to a first turbine for expansion of the hot gas, and a second combustor for receiving gases from the first turbine after expansion of the hot gas in the first turbine to feed the hot gas to a second turbine for expansion of the hot gas via the second turbine, the second combustor comprising a plurality of cans, each of the plurality of cans of the second combustor having a burner that is fed fuel from a fuel distribution system, the fuel distribution system comprising a control valve connected to a plurality of on/off valves to control a flow of the fuel to the burners of the cans of the second combustor, each on/off valve connected to a fuel feed for a respective one of the burners to selectively control the fuel fed to each burner of each can of the second combustor, the method comprising:

admitting the hot gas of the second combustor to the second turbine during part load operation of the gas turbine;

injecting dilution air between the first combustor and the second combustor using a valve to control an inlet temperature of the second combustor and a self-ignition time of the fuel injected into the second combustor; and running at least one of the first combustor and the second combustor under a caloric combustion path such that an air to fuel ratio of combustion for at least the second combustor is kept below a maximum air to fuel ratio by controlling the fuel fed to the plurality of cans of the second combustor during the part load operation of the gas turbine via a fuel control process comprising:

adjusting the control valve to adjust fuel mass flow of the fuel fed to the burners of the cans of the second combustor;

adjusting a first turbine inlet temperature limit of the first turbine from a first limit to a second limit that is above the first limit to allow a turbine inlet temperature of the first turbine to increase to the second limit during the part load operation;

adjusting a turbine exhaust temperature limit for the part load operation of the first turbine so that the turbine exhaust temperature limit of the first turbine is increased;

adjusting a turbine exhaust temperature limit for the part load operation of the second turbine so that the turbine exhaust temperature limit of the second turbine is increased;

after the first turbine inlet temperature limit is adjusted to the second limit, allowing the first turbine inlet temperature to increase until the second limit is reached while the second combustor operates during the part load operation; and adjusting the on/off valve for the burner of the can of the second combustor operating at a lowest temperature at an inlet of the second combustor to stop the fuel mass flow of the fuel fed to that burner of the can of the second combustor;

adjusting a flow of the dilution air fed to the can of the second combustor that had operated at the lowest temperature at the inlet of the second combustor after the adjusting of the on/off valve for the burner of the can of the second combustor operating at the lowest temperature at the inlet of the second combustor occurs so that the dilution air fed to the can is throttled to further oxidize CO and reduce circumferential temperature gradients.

2. The method as claimed in claim 1, wherein both the first combustor and second combustor are run under the caloric combustion path and have a can architecture.

3. A method for CO reduction operation and a low-CO emissions operation of a gas turbine with sequential combustion, wherein the gas turbine includes at least one compressor, a first combustor which is connected downstream to the at least one compressor to heat gas to feed a hot gas to a first turbine for expansion of the hot gas, and a second combustor for receiving the hot gas after the hot gas is expanded in the first turbine to heat the expanded hot gas for feeding to a second turbine for expansion, the second combustor comprising a plurality of cans, each of the plurality of cans of the second combustor having a burner that is fed fuel from a fuel distribution system, the fuel distribution system comprising a control valve connected to a plurality of on/off valves to control a flow of the fuel to the burners of the cans of the second combustor, each on/off valve connected to a fuel feed for a respective one of the burners to selectively control the fuel fed to each burner of each can for all of the cans of the second combustor, the method comprising:

admitting the hot gas of the second combustor to the second turbine; and running the first combustor and second combustor under a caloric combustion path such that an air to fuel ratio of combustion for at least the second combustor is kept below a maximum air to fuel ratio by controlling the fuel fed to the plurality of cans of the second combustor via a fuel control process comprising:

adjusting the control valve to adjust a flow rate of fuel mass flow of the fuel fed to the burners of the cans of the second combustor upon starting up of the second combustor so that less than all of the burners of the cans of the second combustor are initially operational when the starting up of the second combustor begins;

adjusting the on/off valves for the burners of the cans of the second combustor to increase a number of the burners that receive the fuel via the control valve after the second combustor is initially started up such that an amount of burners turned on increases during starting up of the second combustor without violating turbine inlet parameters of the turbine;

adjusting a first turbine inlet temperature limit of the first turbine from a first limit to a second limit that is above the first limit to allow a turbine inlet temperature of the first turbine to increase to the second limit during the part load operation;

adjusting a turbine exhaust temperature limit for the part load operation of the first turbine so that the turbine exhaust temperature limit of the first turbine is increased;

adjusting a turbine exhaust temperature limit for the part load operation of the second turbine so that the turbine exhaust temperature limit of the second turbine is increased;

after the first turbine inlet temperature limit is adjusted to the second limit, allowing the first turbine inlet temperature to increase until the second limit is reached while the second combustor operates during the part load operation;

after the second combustor has started up and has reached a base-load operation, adjusting the on/off valve for the burner of the can of the second combustor operating at a lowest temperature at an inlet of the second combustor to stop the fuel mass flow rate to that burner to increase the flow rate of the fuel mass flow to other burners of the second combustor that are not the burner operating at the lowest temperature to which the fuel mass flow rate has been stopped for reducing CO emissions; and adjusting a flow of dilution air fed to the can of the second combustor that had operated at the lowest temperature at the inlet of the second combustor after the adjusting of the on/off valve for the burner of the can of the second combustor operating at the lowest temperature at the inlet of the second combustor occurs so that the dilution air fed to the can is throttled to further oxidize CO and reduce circumferential temperature gradients.

4. The method as claimed in claim 1, comprising:
before engaging the second combustor, first increasing an outlet temperature of the first combustor to a part load limit and opening a row of variable compressor inlet guide vanes; and
when engaging the second combustor for starting up of the second combustor, closing the row of variable compressor inlet guide vanes of the at least one and introducing the fuel into the second combustor.

5. The method as claimed in claim 1, comprising:
before disengaging the second combustor for unloading of the gas turbine, closing a row of variable compressor inlet guide vanes of the at least one compressor and opening the row of variable compressor inlet guide vanes upon the disengaging of the second combustor.

6. The method as claimed in claim 1, comprising:
when unloading the gas turbine, shutting down the second combustor and opening a row of variable compressor inlet guide vanes of the at least one compressor.

7. The method as claimed in claim 1, comprising:
adjusting the control valve to control the fuel mass flow rate fed to the burners of the second combustor to reduce the air to fuel ratio of the burners of the second combustor.

8. The method as claimed in claim 1, comprising:
increasing an outlet temperature limit of the first combustor to increase a load at which opening of a row of variable compressor inlet guide vanes of the at least one compressor is to occur.

9. The method as claimed in claim 1, wherein the at least one compressor includes a first compressor, and the dilution air is compressed air from the first compressor.

10. The method of claim 3, comprising:
injecting the dilution air between the first combustor and the second combustor using a valve to control an inlet temperature of the second combustor and a self-ignition time of the fuel injected into the second combustor;
wherein the first combustor has an annular architecture and the second combustor is a can combustor.

11. The method of claim 3, comprising:
injecting the dilution air between the first combustor and the second combustor using a valve to control an inlet temperature of the second combustor and a self-ignition time of the fuel injected into the second combustor;
wherein the first combustor has a can architecture and the second combustor is a can combustor.

12. The method of claim 3, comprising:
feeding the dilution air to the second combustor;
adjusting a flow rate of the dilution air fed to the second combustor to reduce the fuel to air ratio.

13. The method of claim 3, wherein the fuel control process also comprises:
adjusting the on/off valve for the burner of the can of the second combustor operating at the lowest temperature to stop the fuel mass flow of the fuel fed to that burner during the part load operation of the gas turbine in which the gas turbine operates below a full load operation of the gas turbine in which all the burners of the second combustor operate, less than all of the burners of the second combustor operating during the part load operation of the gas turbine.

14. The method of claim 13, wherein the at least one compressor includes a first compressor and the dilution air is compressed air from the first compressor, the method also comprising:
cooling the dilution air prior to feeding the dilution air to the burners of the second combustor.

15. The method of claim 1, wherein the first combustor has a can architecture and the second combustor is a can combustor.

16. The method of claim 1, wherein the second combustor is a can combustor.

17. The method of claim 1, comprising:
feeding the dilution air to the second combustor;
adjusting a flow rate of the dilution air fed to the second combustor to reduce the fuel to air ratio.

18. The method of claim 1, wherein the at least one compressor includes a first compressor and the dilution air is compressed air from the first compressor, the method also comprising:

feeding the dilution air from the at least one compressor to the burners of the second combustor.

19. The method of claim 18, comprising:

cooling the dilution air prior to feeding the dilution air to the burners of the second combustor.

* * * * *